AULTMAN & MILLER.
Mowing Machine.
No. 15,160.
Patented June 17, 1856.
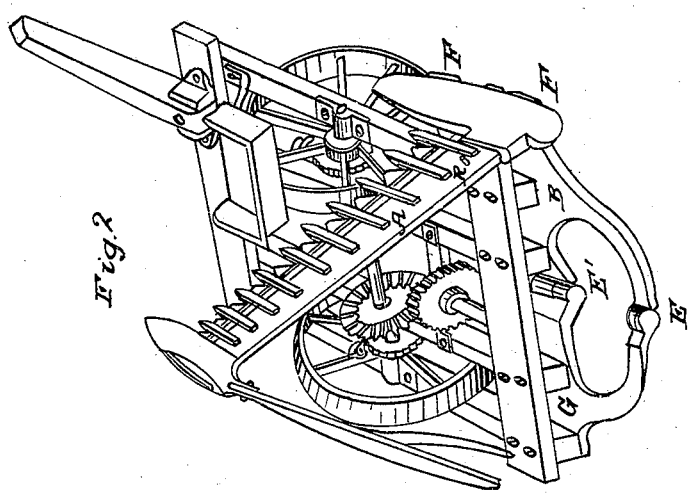
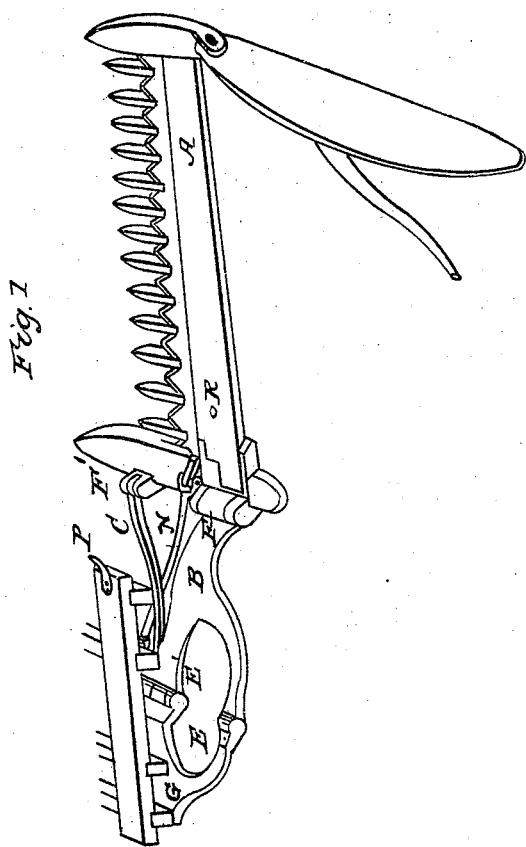

UNITED STATES PATENT OFFICE.

CORNELIUS AULTMAN AND LEWIS MILLER, OF CANTON, OHIO, ASSIGNORS TO BALL, AULTMAN & CO., OF SAME PLACE.

IMPROVEMENT IN MOWING-MACHINES.

Specification forming part of Letters Patent No. 15,160, dated June 17, 1856.

*To all whom it may concern:*

Be it known that we, CORNELIUS AULTMAN and LEWIS MILLER, both of Canton, in the county of Stark and State of Ohio, have invented an Improvement in Mowing-Machines; and we do hereby declare that the following is a full, clear, and exact description of the principle or character which distinguishes it from all other things before known, and of the usual manner of making, modifying, and using the same, reference being had to the accompanying drawings, of which—

Figure 1 is a perspective view, showing the attachment of the cutter-bar to the machine; and Fig. 2, a perspective of the machine, showing the cutter-bar turned up and over the machine.

Our improvement consists in a peculiar mode of hinging the cutter-bar to the machine, as hereinafter described.

A represents the cutter-bar. This cutter-bar is attached to the frame in such a manner that it can be raised and lowered so as to adjust itself to the unevenness of the ground, and can also be raised up entirely and fastened to the machine after the work on the field is finished, as it is represented in Fig. 2 on the drawings.

The connection of the cutter-bar is effected by hinges F F', braces B and C, hinges E E', and brace G. Brace G is fixed fast to the frame. Brace B, with its strengthening-branch C, can be moved up and down by means of the hinges E E'. Braces B and C are cast of one solid piece, but in such a shape that the connecting-rod N, which works the knives, can move between braces B and C. This jointed brace B is connected with the cutter-bar A by means of hinges F F', which will permit the cutter-bar to be raised on the outer end, while the hinges E E' will permit the other end also to rise and the whole cutter-bar to slide over the slightest unevenness of ground.

When the work on the field is finished, or at any other time, the cutter-bar can be raised up and fastened to the machine by means of a projecting pin, P, which will fit in a corresponding hole, R. By this arrangement the machine will occupy less room, and can be easily moved over roads and fields without being exposed to the danger of breaking the cutter-bar.

It will be seen that this mode of connecting the cutter-bar to the machine by the two joints F F' E E', which I call the "double-rule joints," allows the cutter-bar to rise and lower at both or either of its ends, and, having motion only in one vertical plane, it can be raised up and thrown over the machine, as shown in Fig. 2, without requiring a universal joint for the connecting-rod which gives motion to the cutters, as is the case where one of the joints is on the front beam of the machine.

We do not claim connecting the cutter-bar to the machine by a hinge-joint; nor do we claim the joint at or near the extremity of the cutter-bar; but

We claim—

Connecting the cutter-bar to the machine by the double-rule joint or the double-jointed coupling-piece B C, in the manner and for the purposes hereinabove set forth.

CORNELIUS AULTMAN.
     L. MILLER.

Witnesses:
 I. H. SMITH,
 JAS. S. TONNER.